(12) United States Patent
Huang et al.

(10) Patent No.: US 11,680,749 B2
(45) Date of Patent: Jun. 20, 2023

(54) FEEDER DEVICE UTILIZED IN ELECTRIC ARC FURNACE, AND FLUE GAS AND TEMPERATURE CONTROL METHOD

(71) Applicant: Cisdi Engineering Co., Ltd., Chongqing (CN)

(72) Inventors: Qiming Huang, Chongqing (CN); Cunzhen Tan, Chongqing (CN); Zhan Gao, Chongqing (CN); Weizhi Shi, Chongqing (CN); Yuchuan Zhang, Chongqing (CN)

(73) Assignee: CISDI Engineering Co., Ltd., Chongqing (CN)

( * ) Notice: Subject to any disclaimer, the term of this patent is extended or adjusted under 35 U.S.C. 154(b) by 1089 days.

(21) Appl. No.: 16/305,383

(22) PCT Filed: Apr. 14, 2017

(86) PCT No.: PCT/CN2017/080517
§ 371 (c)(1),
(2) Date: Oct. 26, 2019

(87) PCT Pub. No.: WO2017/206595
PCT Pub. Date: Dec. 7, 2017

(65) Prior Publication Data
US 2020/0041206 A1    Feb. 6, 2020

(30) Foreign Application Priority Data

May 30, 2016    (CN) .......................... 201610369480.8
Dec. 6, 2016     (CN) .......................... 201611110753.3

(51) Int. Cl.
*F27B 3/18*  (2006.01)
*F27B 3/08*  (2006.01)
*F27D 3/00*  (2006.01)

(52) U.S. Cl.
CPC ................ *F27B 3/18* (2013.01); *F27B 3/085* (2013.01); *F27D 2003/0034* (2013.01)

(58) Field of Classification Search
CPC .. C21C 5/527; F27B 3/085; F27B 3/18; F27B 3/186; F27D 2003/0034
(Continued)

(56) References Cited

U.S. PATENT DOCUMENTS 2,776,881 A * 1/1957 Thomsen .................. C22B 4/04
                                                          75/10.36
5,492,309 A * 2/1996 Meierling ............... C21C 5/527
                                                          266/156
(Continued)

FOREIGN PATENT DOCUMENTS

CN    105202907    * 12/2015    ................ F27B 3/18
JP    2002180115   *  6/2002    ................ F27B 3/18

*Primary Examiner* — Scott R Kastler
*Assistant Examiner* — Michael Aboagye
(74) *Attorney, Agent, or Firm* — Michael D. Eisenberg (57) ABSTRACT

A sealed feeder device utilized in an electric arc furnace (1), and a flue gas and temperature control method. The sealed feeder device comprises a sealed feeding chute (5) having an outlet sealedly communicating with a side wall of the electric arc furnace (1), and a material blocking sealed arc-shaped door (3) disposed in the sealed feeding chute (5). The material blocking sealed arc-shaped door (3) separates the sealed feeding chute (5) into a cold steel scrap storage chamber (18) and a material feeding and dedusting chamber (2), and is operated by a driving mechanism (34) to separate or connect the cold steel scrap storage chamber (18) and the material feeding and dedusting chamber (2). The method comprises: adopting the feeder device to divide the flue gas of the electric arc furnace (1) into two paths, and controlling, by a flue gas adjustment device (16), a ratio of a flue gas flow from a flow-splitting dust removal pipe (11) to that from a
(Continued)

dust removal pipe (4) to obtain a required flue gas mixture temperature.

9 Claims, 10 Drawing Sheets (58) Field of Classification Search
USPC ............ 373/60, 81, 80, 79, 85; 266/44, 159,
266/171, 184, 207, 901; 414/21, 162,
414/160, 198, 199, 208
See application file for complete search history.

(56) References Cited

U.S. PATENT DOCUMENTS

| | | | |
|---|---|---|---|
| 5,887,016 A * | 3/1999 | Feuerstacke | C21C 5/527 373/79 |
| 6,250,450 B1 * | 6/2001 | Howard | B65G 11/166 193/2 R |
| 8,485,336 B2 * | 7/2013 | Tenold | B65G 11/166 193/25 E |
| 10,928,136 B2 * | 2/2021 | Huang | F27D 13/002 |
| 2014/0126604 A1 * | 5/2014 | Rummler | C21C 5/527 141/2 |

* cited by examiner

FEEDER DEVICE UTILIZED IN ELECTRIC ARC FURNACE, AND FLUE GAS AND TEMPERATURE CONTROL METHOD

TECHNICAL FIELD

The present invention belongs to the technical field of metallurgy, and particularly relates to a sealed rapid feeder device with an adjustable blanking point and utilized in an electric arc furnace, and a flue gas temperature control method.

BACKGROUND

Energy saving, consumption reduction, being environmentally friendly and automation in electric arc furnace steel making are always core techniques in the development of electric arc furnace steel making technology.

Among energy saving techniques of electric arc furnace steel making, shortening smelting time, feeding material with cover sealed, reducing feeding frequency, and preheating steel scrap by flue gas are common energy saving techniques in production process. The techniques of preheating steel scrap with flue gas in an electric arc furnace, which emerged in the 1980s, are typical energy saving techniques, and typical representatives of such techniques include finger shaft furnace (DE4025249A1-1992), vibration and continuous feeding CONSTEEL (U.S. Pat. No. 5,400,358-1992) and side push shaft feeding (US2007/0013112A1) techniques. The use of these steel scrap preheating techniques reduces the electric power consumption of smelting in an electric arc furnace. However, steel scrap preheating has brought negative effects. On one hand, relatively more maintenance is needed for a steel scrap preheating device; on the other hand, the use of steel scrap preheating techniques brings additional environmental protection problems as the emission of dioxin from a steel scrap preheating electric arc furnace is exponentially increased compared with that from a traditional electric arc furnace. With the increasingly strict implementation of environmental protection policies, new environmental laws and regulations in various countries have put forward formal control requirements for the emission of dioxin from an electric arc furnace during steel making. For example, in China, a new environmental protection policy has restricted the use of steel scrap preheating technique of flue gas rapid cooling in an electric arc furnace. Flue gas rapid cooling after steel scrap preheating in an electric arc furnace comprises the following two steps: burning the low-temperature flue gas exhausted after steel scrap preheating again with natural gas or coal gas in an reburning device to reach a temperature of 850-900° C., and maintaining for more than 3 seconds to make the dioxin fully decomposed at the high temperature; cooling the flue gas rapidly (in 3 seconds) from the high temperature to a temperature below 200-250° C. in a flue gas quench tower, wherein the rapid cooling of the flue gas inhibits the resynthesis of dioxin in flue gas cooling process. However, the amount and temperature of flue gas are unstable in a production cycle of the electric arc furnace, and it is difficult to control flue gas combustion and rapid cooling exactly in synchronization, so the energy loss after flue gas reburning and rapid cooling will erode most of the electric power saving ability of steel scrap preheating. Considering the increased maintenance cost of equipment, the use of steel scrap preheating techniques in areas with high environmental protection requirements will bring higher cost, so steam is used to recover the waste heat in flue gas in most cases. Of course, if the cost of dioxin environmental processing can be reduced, steel scrap preheating techniques still have a good market.

According to the analysis of the production process of the electric arc furnace, it is also an important technical means to save energy and protect environment by reducing the cover opening frequency or feeding material with cover sealed because opening the cover to feed material will not only cause a large amount of heat loss (each time the cover is opened, the energy consumption is 10-15 kwh per ton of steel, and the cover needs to be opened 2-3 times per heat for the traditional electric arc furnace), but also cause production environment pollution and increase the dust emission during production process, which needs to increase the air volume for dedusting of a whole workshop; the feeding process increases the auxiliary time of steel making process and increases the energy consumption; the operation of equipment (furnace cover, electrodes, etc.) of the electric arc furnace are increased, so the maintenance of the equipment of the electric arc furnace will be increased accordingly. A typical example of reducing the cover opening frequency is one-basket feeding technique for electric arc furnace production. However, one-basket feeding technique has brought the problems that the size of the furnace (the volume for holding steel scrap) is increased, the lifting stroke of electrodes is increased (which affects the cross arm system), and the elevation of a crane and the height of the workshop are affected, so investment and other efficiencies are negative.

Therefore, if feeding material with cover sealed in the traditional electric arc furnace can be achieved, even if the steel scrap is added as cold material, it can play a certain role in saving energy for electric arc furnace production and can improve the production environment of electric arc furnace workshop; meanwhile, the problem that additional dioxin emission caused by steel scrap preheating is exponentially increased can be eliminated (consistent with traditional electric arc furnace), and the smelting environment in the furnace and the steel quality can be improved.

Furthermore, the high temperature of flue gas in the electric arc furnace is above 1800° C. Sensible heat recovery of flue gas is achieved by steam recovery or steel scrap preheating, or both. A relatively low level of energy is obtained by steam waste heat recovery of electric arc furnace (electric arc furnace production is not continuous, temperature of the flue gas is not stable, the quality of steam for waste heat recovery is not high, the cost for conversion into electric power is relatively high, and the efficiency is relatively low); more specifically, if steam with energy equivalent to 100 kwh/t of heat energy is obtained by waste heat recovery, the energy is converted into about 20 kwh/t of electric energy (calculated by a total conversion efficiency of 20%). Considering the investment as well as operation and maintenance costs of power generation equipment, electric arc furnace waste heat recovery is not an ideal high-quality way of energy recovery at present. Heating steel scrap with flue gas can directly save electric energy input, and the heat energy input for preheating steel scrap has positive benefit when converted into electric energy due to the thermal efficiency of the electric arc furnace system itself; more specifically, if 40 kwh/t of heat is introduced to the electric arc furnace by steel scrap preheating, it can be converted into a reduction of 52-55 kwh/t of electric energy input from the electrodes of the electric arc furnace. However, steel scrap preheating has the problem that dioxin needs to be processed for environmental protection purpose, which will consume part of the energy saved by steel scrap preheating.

The amount and temperature of flue gas will vary in different time periods of the smelting cycle of the electric arc furnace, the temperature is low at both end and high in the middle period of the smelting cycle or low temperature zones appear in the middle period at intervals, and the temperature variation range is 400-1860° C. (measured at four holes with part of molten iron), as a result, if the flue gas penetrates the steel scrap layer and the temperature of the flue gas is maintained at above 800° C. (e.g., the temperature of the flue gas can be controlled at above 900° C.), the dioxin in the flue gas will be decomposed, and the resynthesis of dioxin in flue gas is inhibited after the flue gas enters a quench device. High-quality recovery of sensible heat of flue gas with a temperature of (1400-1800)–900=>500° C. in the middle time period can still be achieved by steel scrap preheating, so the conflict between energy saving and being environmentally friendly is taken into account. However, because of the changing temperature and amount of flue gas, the size of steel scrap, the temperature of steel scrap, the air permeability of steel scrap and the heat taken away by the equipment, it is difficult to stably control the temperature of the flue gas passing directly through the steel scrap layer in a sealed feeder device of an electric arc furnace.

For this reason, the present invention splits part of the electric arc furnace flue gas to preheat steel scrap in a steel scrap feeder device, and uses a high-temperature flue gas passage; high-temperature flue gas is mixed with low-temperature flue gas after steel scrap preheating, and the temperature of the flue gas mixture is controlled at above 900° C. Equipment adopting this technical solution is highly feasible and convenient to inspect and control. As the energy loss as well as equipment operation and investment in the intermediate link of cooling flue gas by steel scrap and reburning a large amount of flue gas in a traditional steel scrap preheating electric arc furnace are saved, this idea is a relatively economical dioxin processing solution in the sealed feeding process of an electric arc furnace.

The present invention enables scraps to be quickly added into an electric arc furnace; controls the steel scrap blanking by means of a sealed feeding chute with a large inclination angle and a baffle of a material blocking sealed door; isolates the flue gas in the furnace from the air outside the furnace to realize sealed feeding of the electric arc furnace; overcomes the problem of a smelting cold region caused by material accumulation on one side in the process of sealed feeding by controlling a blanking point, thereby making the smelting electric arc of the electric arc furnace heat more even, and improving the flue gas leak tightness of the electric arc furnace during electric arc furnace operation; reduces the impact on the device during feeding process; improves the reliability of equipment components against the impact of steel scrap; and increases the service life of the equipment. What's more, after this solution is adopted, energy saving is achieved to a certain extent in the smelting process itself of the electric arc furnace, and exhausted flue gas reburning with high energy consumption is not necessary (or greatly reduced). This solution is not only applicable to the modification of old electric arc furnace equipment, but also applicable to newly introduced electric arc furnace equipment, which is worth popularizing in sealed feeding technology of electric arc furnace.

SUMMARY

In view of this, the purpose of the present invention is to provide a technique that can realize sealed center feeding of electric arc furnace so as to reduce electric power consumption, shorten smelting time, avoid or inhibit the problem of energy consumption for processing dioxin brought by energy saving techniques (steel scrap feeding and preheating) of an electric arc furnace, and improve the leak tightness of the electric arc furnace in production and operation.

To achieve the above purposes, one purpose of the present invention is realized by the following technical solution:

The present invention provides a sealed feeder device utilized in an electric arc furnace, which comprises a sealed feeding chute having an outlet sealedly connecting with a side wall of the electric arc furnace, and a material blocking sealed door disposed in the sealed feeding chute, wherein the material blocking sealed door separates the sealed feeding chute into a cold steel scrap storage chamber and a material feeding and dedusting chamber, and is operated by a driving mechanism to separate or connect the cold steel scrap storage chamber and the material feeding and dedusting chamber, and the inclination angle of the sealed feeding chute relative to the horizontal plane is 30-60°.

In the present invention, the sealed feeding chute has an inclination angle to ensure that the natural dropping point is the bottom of the chute and a material blocking door is not impacted directly when material is fed to the device, thus protecting the safety of the material blocking door. To extend the maintenance life of the equipment and reduce the maintenance difficulty of the equipment when maintenance is needed, a strip replaceable liner plate is disposed in the blanking point area of the sealed feeding chute.

Further, the material blocking sealed door is a material blocking sealed arc-shaped door constrained by swing arms and comprising a door panel and the swing arms; one end of each swing arm is fixed together with the door panel, and the other end is rotatablely fixed together with the sealed feeding chute through a rotating shaft.

Further, both ends of the door panel are respectively provided with a swing arm connected by an intermediate girder to make the swing arms form a portal frame structure, and the door panel is fixed together with the intermediate girder.

Further, the swing arms form a portal frame, and the upper end of the door panel is fixed on the intermediate girder. Further, the material blocking sealed door is a plug door constrained by a guide pulley and a guide rail.

Further, the door panel or the plug door is a planar straight panel or a curved arc-shaped panel.

Further, a flue gas sealing edge is disposed on the periphery of the door panel or the plug door.

Further, the connection between the material feeding and dedusting chamber and the side wall of the electric arc furnace is provided with a telescopic chute and a telescopic chute driving device.

Further, the telescopic chute is composed of an inclined section integrated with the wall of the electric arc furnace and a telescopic section fixed on the telescopic chute driving device.

Further, the telescopic chute driving device is a guide cart or an oil cylinder or an air cylinder or an electric push rod.

Further, a vibration exciter for forced vibration feeding is disposed in the cold steel scrap storage chamber.

Further, the sealed feeder device further comprises a mobile cart which is provided with a fixing frame, and the sealed feeding chute is fixed on the fixing frame.

Further, the steel scrap storage chamber and the material feeding and dedusting chamber have an inwardly dished arc-shaped bottom.

Further, the bottom end surface of the door panel or the plug door has an arc corresponding to the arc-shaped bottom.

Further, the arc-shaped bottom surface of the door panel or the plug door is provided with a plurality of sawteeth at intervals.

Further, the inlet of the steel scrap storage chamber is provided with a mobile sealed door.

Further, the material feeding and dedusting chamber is provided with a dust removal pipe connecting with the outside.

Further, the steel scrap storage chamber is provided with a flow-splitting dust removal pipe connecting with the outside.

In a more preferred technical solution of the present invention: the material feeding and dedusting chamber and the steel scrap storage chamber of the sealed feeder device utilized in an electric arc furnace are connected through a three-way connecting structure which can adjust flue gas flows; the other passage of the three-way structure is a mixed flue gas outlet passage and also a dust removal passage of an electric arc furnace.

Further, the three-way structure is provided with a swing valve plate, the swing valve plate is confined in the middle part of the outlets of the material feeding and dedusting chamber and the steel scrap storage chamber and the inlet of the other passage of the three-way structure to control or close the flue gas flows of the material feeding and dust removal chamber and the steel scrap storage chamber.

Still further, the swing valve plate is driven by the driving mechanism through the rotating shaft, and swings left and right along with the rotating shaft to adjust or close the flue gas flow at the outlets of the material feeding and dedusting chamber and the steel scrap storage chamber.

To achieve the above purposes, another purpose of the present invention is realized by the following technical solution:

The present invention provides a flue gas and temperature control method for sealed feeding of an electric arc furnace, which comprises: adopting the above-mentioned sealed feeder device utilized in an electric arc furnace to divide the flue gas of the electric arc furnace into two paths, wherein the high-temperature flue gas near the electric arc furnace is guided out by the dust removal pipe, the low-temperature flue gas passing through the steel scrap in the sealed feeder device is guided out by the flow-splitting dust removal pipe, and the two paths of flue gas is mixed again through the pipes; controlling, by a flue gas adjustment device, a ratio of a flue gas flow from a flow-splitting dust removal pipe to that from a dust removal pipe to obtain a required flue gas mixture temperature.

Further, the two paths of flue gas is mixed in the steel scrap storage chamber, and the flue gas mixture temperature is controlled by the material blocking sealed door and the flue gas adjustment device; a burner is used for fine tuning and auxiliary control of the steel scrap preheating level.

The present invention has the following beneficial effects:

1. Feeding material with cover sealed is achieved, which prevents the heat loss caused by opening cover, and the energy saving efficiency is estimated to be 15-30 kwh/t; the production operation mode can be the same as that of the traditional electric arc furnace (10%-15% of steel is left), and continuous production operation with a large amount of steel left (40%-70% of steel is left) or the production operation of adding part of molten iron can be adopted.

2. Due to fully sealed production, the contact between hot metal and N in air can be reduced, the content of N in molten steel can be reduced, and thus the quality of steel can be improved.

3. Cold material feeding is adopted, so no additional flue gas environmental processing devices such as flue gas reburning and rapid cooling devices are needed; if the electric arc furnace production is of sufficient economic value, the steam waste heat recovery technique can be adopted for flue gas, and no additional harmful substance caused by steel scrap preheating will be produced (consistent with traditional electric arc furnace); furnace cover, the upper part of the material feeding and dedusting chamber and subsequent flue can be used as waste heat steam recovery points.

4. Flow-splitting steel scrap preheating is adopted to accurately control the temperature of flue gas mixture after preheating, so the flue gas temperature for rapid cooling of flue gas to inhibit the resynthesis of dioxin can be achieved without the need for flue gas reburning (or with the need of a small amount of flue gas reburning); the energy saving efficiency of this process is estimated to be 40-60 kwh/t, and the operating cost of dioxin control is low.

5. Fast material feeding is achieved by a chute with a large inclination angle, and the blanking process only takes a few seconds, so even considering the time of lifting the electrodes and opening the arc-shaped door, the auxiliary time of opening the cover, feeding material and hoisting is shortened, and the smelting cycle per heat is shortened by 3-5 min.

6. The cold steel scrap storage chamber formed by the sealed feeding chute and the material blocking sealed arc-shaped door has strong impact resistance, and the adaptability thereof to material size and so on is close to that of traditional material basket feeding method and is relatively strong in the existing sealed feeding method of electric arc furnace.

7. Side wall material feeding is achieved by the chute, and material is fed to an area near the center of the furnace, so the problem of cold region in the furnace during side wall feeding is improved or eliminated, the heating efficiency of electric arc is improved, and energy is saved.

8. The telescopic chute disposed at the connection between the material feeding and dedusting chamber and a furnace body is one of the key points of the present invention:

When this chute is withdrawn slightly from a lower furnace body, the furnace body has a large swing operation space relative to the feeder device (e.g., the furnace body is inclined by 15° in tapping process); on one hand, the movement of whole feeder device translation is omitted, which is beneficial to improving the operating efficiency; on the other hand, the upper part of the material feeding and dedusting chamber is still connected with the furnace body, which dramatically prevents flue gas from escaping;

Meanwhile, the blanking point can be adjusted by the telescopic chute; when necessary, if side wall material accumulation occurs in the feeding area, the material on the upper part of a material outlet can be pushed to move to a position closer to the center of the furnace by multiple telescopic motions of the telescopic chute.

In general, the present invention makes electric arc furnace production more energy-saving and environmentally friendly; the device is simple and convenient to maintain, has great investment and construction advantages, is not only applicable to the modification of an old electric arc furnace, but also applicable to a newly built electric arc furnace project, and has wide adaptability.

Numerals in the figures: 1 electric arc furnace, 2 material feeding and dedusting chamber, 3 material blocking sealed arc-shaped door, 31 door panel, 32 swing arm, 33 rotating shaft, 34 driving mechanism, 35 flue gas sealing edge, 36 guide pulley, 4 dust removal pipe, 5 sealed feeding chute, 6 mobile sealed door, 7 telescopic chute, 8 guide cart, 9 mobile cart, 10 external feeder device, 11 flow-splitting dust removal pipe, 12 flow-splitting flue gas adjustment valve, 13 temperature measuring element, 14 flue gas hold-up vessel, 15 flue gas quench device, 16 hot flue gas adjustment device, 17 fixing frame, 18 steel scrap storage chamber, 19 vibration exciter, 20 tooth structure, 21 burner, 22 three-way structure, 23 strip heat-resisting liner plate at blanking point of feeder device, 24 swing valve plate, 25 preheating chamber extraction opening; f1 low-temperature flue gas, f2 high-temperature flue gas, f1+f2 flue gas mixture.

DETAILED DESCRIPTION

Preferred embodiments of the present invention will be described below in detail in combination with drawings.

Invention I: Sealed Feeder Device Utilized in Electric Arc Furnace

Embodiment 1

Figure 1:
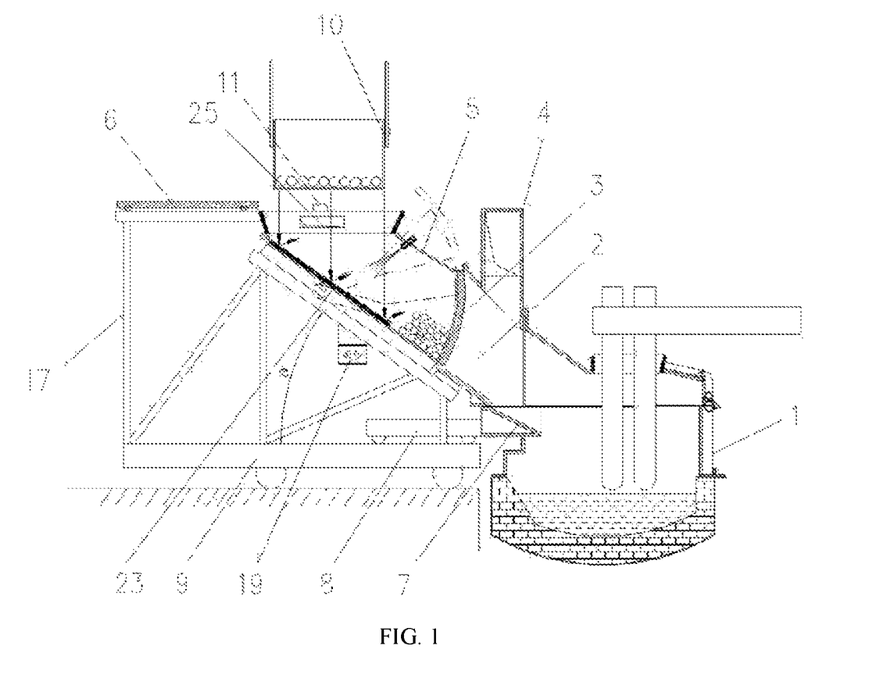
FIG. 1 is a structural schematic diagram of the first embodiment of a sealed feeder device utilized in an electric arc furnace of the present invention.

As shown in FIG. 1, the sealed feeder device utilized in an electric arc furnace of this embodiment comprises a mobile cart 9, a fixing frame 17 on the mobile cart 9, a sealed feeding chute 5 fixed on the fixing frame 17, wherein the outlet of the sealed feeding chute 5 is sealedly communicated with a side wall of the electric arc furnace, a material blocking sealed door 3 disposed in the sealed feeding chute 5, the material blocking sealed door 3 is in the structure of a material blocking sealed arc-shaped door, separates the sealed feeding chute into a cold steel scrap storage chamber 18 and a material feeding and dedusting chamber 2, and is operated by a driving mechanism to separate or communicate the cold steel scrap storage chamber 18 and the material feeding and dedusting chamber 2, the inlet of the steel scrap storage chamber is provided with a mobile sealed door 6 used for separating or opening an external feeder device 10, and a dust removal pipe 4 is disposed in the material feeding and dedusting chamber 2 in order to remove dust; in this way, an electric furnace can adopt fully sealed material feeding production.

The inclination angle of the sealed feeding chute ensures that the natural blanking point is the bottom of the chute and the material blocking door (or a tooth rake) is not impacted directly when material is fed to the device. A detachable heat-resisting liner plate 23 is installed in the blanking point area, so that the impact to the weakest part (i.e. the material blocking sealed door 3) of the device can be reduced, the maintenance life of the equipment can be extended, and the maintenance difficulty of the equipment when maintenance is needed can be reduced (it only needs to replace the heat-resisting liner plate 23).

When the electric arc furnace is in production, the mobile sealed door 6 is opened, material is fed to the cold steel scrap storage chamber 18 by the external feeder device 10, a closed baffle of a material blocking sealed door 3 controls the steel scrap blanking, prevents the overflow of electric arc furnace flue gas and heat radiation, and prevents external air from being sucked into the dust removal pipe 4, and the raw material and hot flue gas in the steel scrap storage chamber 18 is isolated by the material blocking sealed arc-shaped door 3; when material is fed into the feeder device, the electric arc furnace is in sealed state, the production of the electric arc furnace itself is not affected, and the high-temperature flue gas in the electric arc furnace is sucked away by the dust removal pipe 4. The position of the blanking point can be moderately controlled by controlling the position of the telescopic chute 7 in the electric furnace.

For the convenience of preheating externally fed material, a preheating chamber extraction opening 25 is formed on the upper part of the steel scrap storage chamber 18, and the preheating chamber extraction opening 25 is communicated with the flow-splitting dust removal pipe 11.

Figure 2:
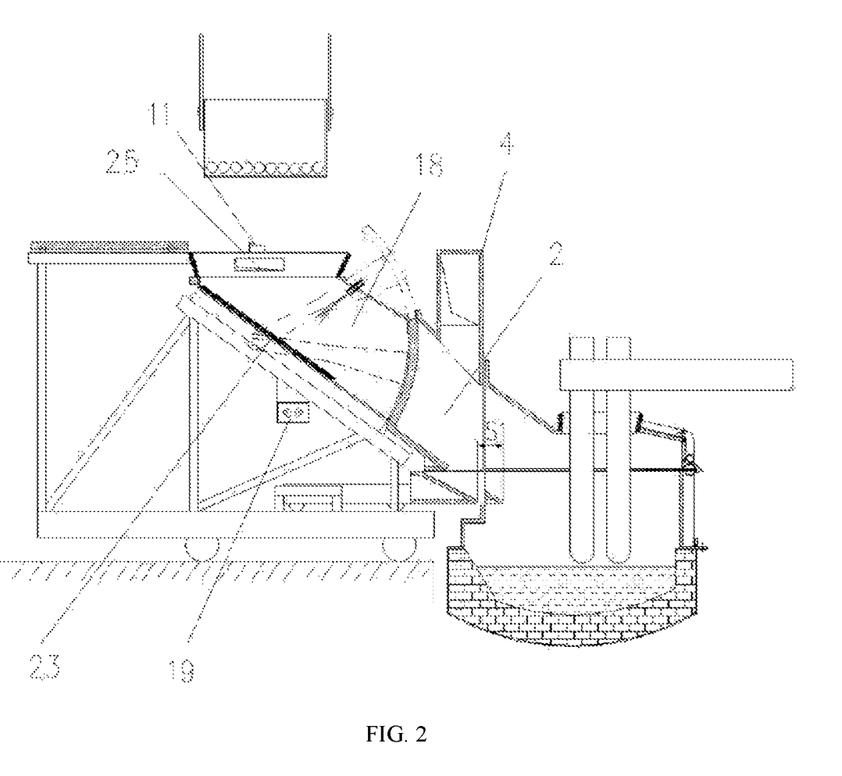
FIG. 2 is a schematic diagram of a telescopic chute withdrawn from an electric arc furnace.

As shown in FIG. 2, when the telescopic chute 7 is withdrawn slightly from an outer side wall of the electric furnace, the electric furnace can be inclined by a small angle according to the production operation requirements, and the electric furnace is still in a good sealed state.

Figure 3:
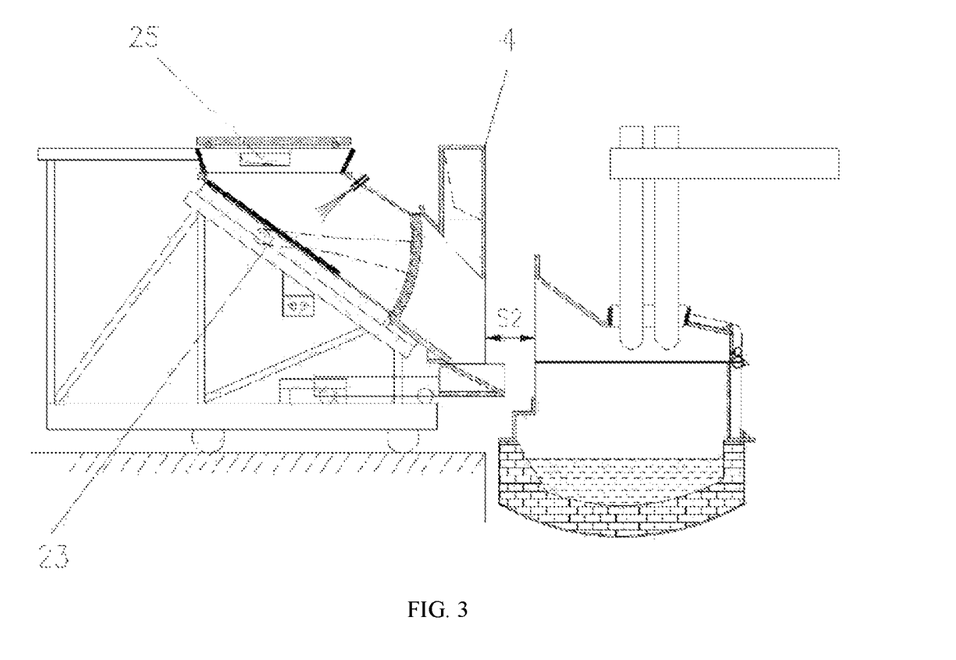
FIG. 3 is a schematic diagram of the completely disconnected state between the present invention and an electric arc furnace.

As shown in FIG. 3, when the cover of the electric arc furnace needs to be opened for material feeding (for certain extra heavy material), and when the electric arc furnace or the feeder device need maintenance, the feeder device can be moved in whole by the mobile cart to separate from the electric arc furnace and facilitate all kinds of operations and equipment maintenance.

Figure 4:
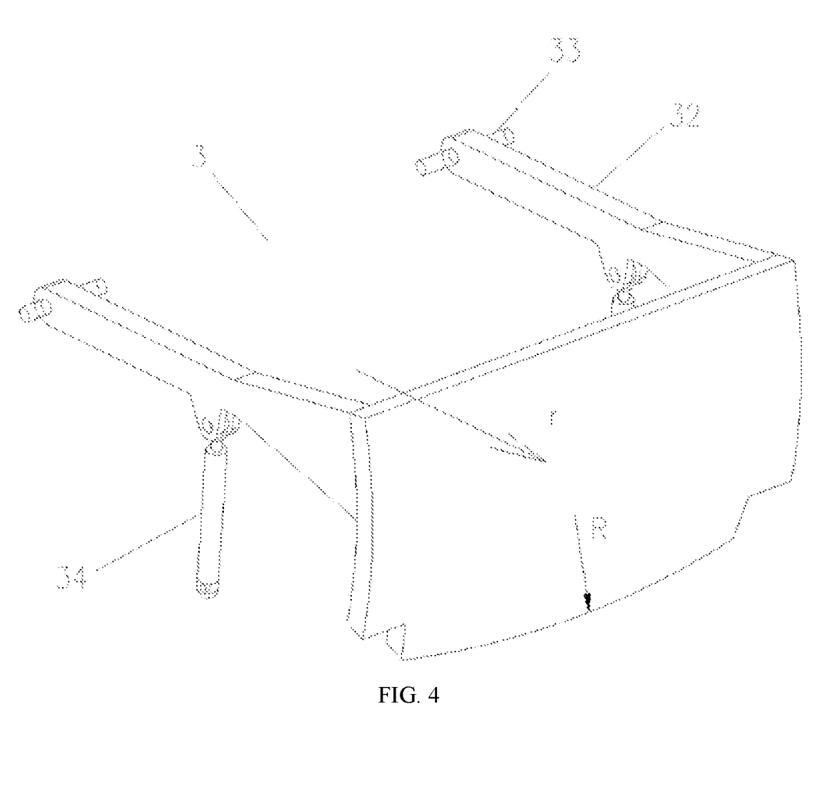
FIG. 4 is a schematic diagram of a material blocking sealed door which is a material blocking sealed arc-shaped door.

As this embodiment, and as shown in FIG. 4, the material blocking sealed door 3 is a material blocking sealed arc-shaped door comprising the door panel 31 and the swing arms 32; one end of each swing arm 32 is fixed together with the door panel 31, and the other end is rotatably fixed together with the sealed feeding chute through the rotating shaft 33; the driving mechanism 34 is disposed near the middle part of each swing arm 32, and the swing arms 32 is operated by the driving mechanism 34 to rotate around the rotating shaft and drives the door panel 31 to move away from or towards the bottom of the cold steel scrap storage chamber repeatedly, and thus to separate or communicate the material feeding and dust removal chamber and stop or transport steel scrap; more specifically, two swing arms 32 are used and respectively fixed on both ends of the length of the door panel 31 to increase the bearing capacity of the door panel.

Figure 5:
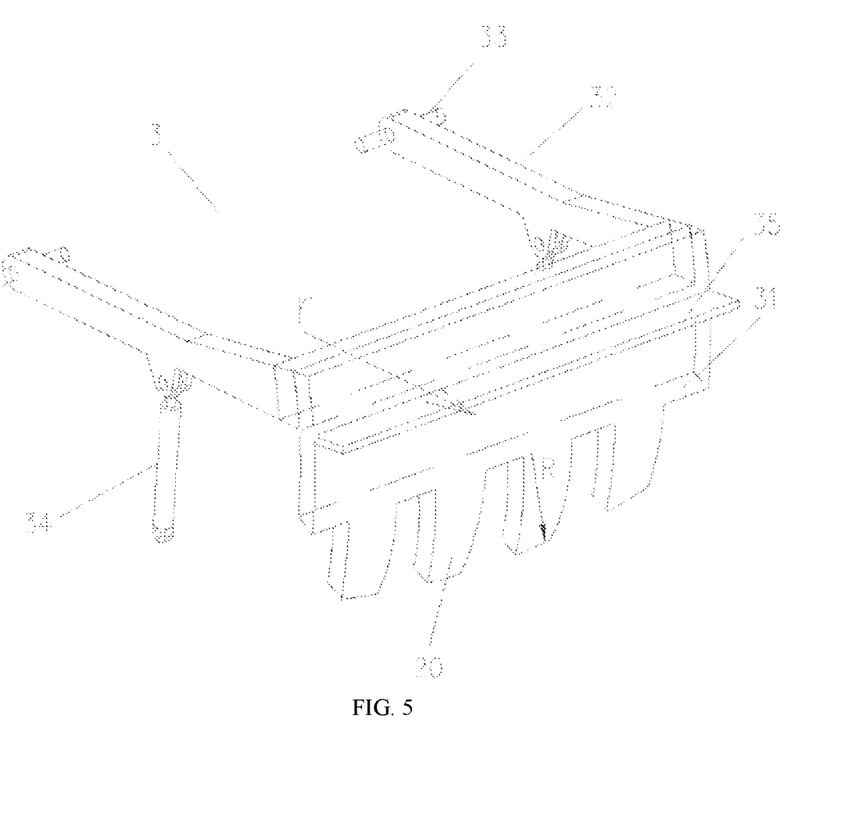
FIG. 5 is a schematic diagram of a material blocking sealed door which is an improved material blocking sealed arc-shaped door.

As an improvement of this embodiment, and as shown in FIG. 5, the swing arms are connected by an intermediate girder to make the swing arms form a portal frame structure, and at this point, the upper end of the door panel is fixed together with the intermediate girder to facilitate the removal and maintenance of the door panel in whole.

A flue gas sealing edge 35 is disposed on one or more sides of the periphery of the door panel, and is disposed on the upper side in this embodiment to improve the flue gas leak tightness against the outside; meanwhile, a plurality of tooth structures 20 protruding towards the bottom of the cold steel scrap storage chamber are disposed on the bottom end surface of the door panel at intervals to make the door panel have improved material blocking function and relatively strong gas permeability. With the extension of the tooth structures, the door panel shrinks and can evolve into a tooth rake.

Figure 6:
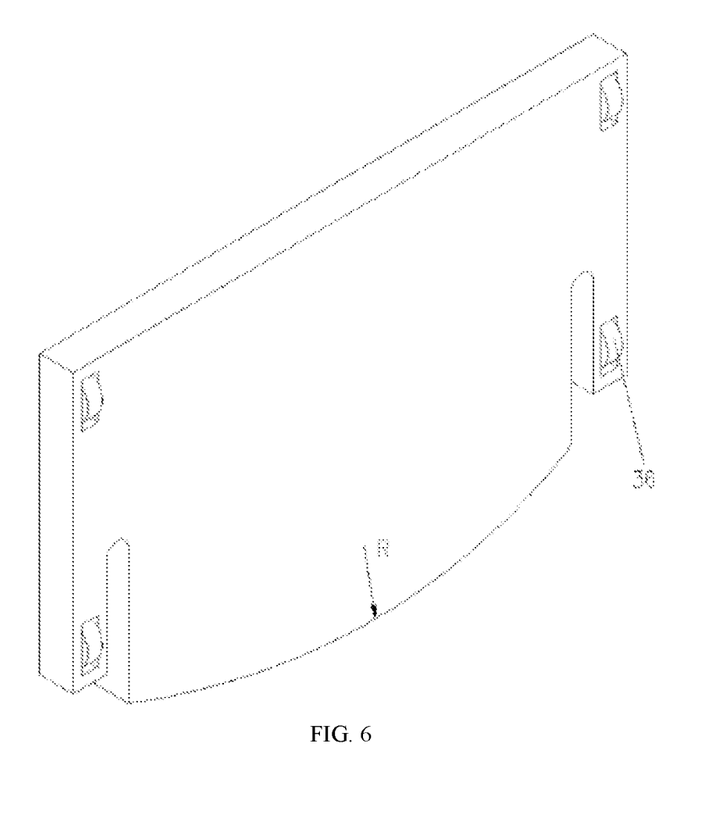
FIG. 6 is a schematic diagram of a material blocking sealed door which is a material blocking sealed plug door.

As a derivative of this embodiment, and as shown in FIG. 6, the material blocking sealed door 3 is a plug door, the door panel 31 is a planar straight panel, a plurality of guide pulleys 36 are disposed on the door panel, a common guide pulley and guide rail structure in mechanics is adopted, the guide pulleys and the guide rails are prevented from high temperature, and at this point, the material blocking sealed arc-shaped door evolves into a material blocking plug door. Of course, when necessary, the flue gas sealing edge 35 can also be disposed to improve the leak tightness, or short teeth can be added to the lower edge to improve gas permeability and material blocking performance.

As an improvement of this embodiment, and as shown in FIG. 1, the connection between the material feeding and dust removal chamber and the side wall of the electric arc furnace is provided with a telescopic chute 7 and a telescopic chute driving device, wherein the telescopic chute driving device can be a guide cart or an oil cylinder or an air cylinder or an electric push rod, which is a guide cart 8 in this embodiment, and the guide cart 8 can also be placed on the mobile cart; more specifically, the telescopic chute 7 has the following functions:

1) Achieving the technological operation and flue gas leak tightness of the electric arc furnace: in order to ensure the material fed falls into the electric arc furnace during side wall feeding, the lower furnace body must be bonded with the feeder device, but this structure is in conflict with the technological operation. The process of electric arc furnace smelting is required to have an inclination operation perpendicular to the blanking direction, at this point, the bonded vertical surface forms a sealing surface in relative motion, and the bonded horizontal surface will become an interference surface in inclination operation. The solution in the present invention is that the telescopic chute 7 on the front lower end of the material feeding and dedusting chamber 2 is withdrawn and disconnected from the lower furnace body, so enough space is released for the bonded interference surface in inclination operation, the swinging space of the bonded surfaces is released by the telescopic chute 7, and the electric arc furnace 1 can be inclined. At this point, most area of the upper part of the material feeding and dedusting chamber 2 is still connected with the electric arc furnace, the flue gas of the electric arc furnace is sucked away by the dust removal pipe 4, and the electric arc furnace 1 is still in good flue gas sealed state (as the hot flue gas will float up, the flue gas will not escape from the electric arc furnace);

2) Adjusting blanking: the blanking point of raw material in the furnace can be adjusted by the telescopic chute 7 in different positions;

3) Pushing steel material: if side wall material accumulation occurs on the feeding side, the upper part of the accumulated material can be pushed to a position near the center of the electric arc furnace by multiple reciprocating motions of the telescopic chute 7, as denoted by XX in the figure.

It can be seen that the telescopic chute 7 is an important component that can not only meet the technological operation of the electric arc furnace, but also realize the three functions of sealing flue gas, adjusting blanking and pushing steel material.

As an improvement of this embodiment, and as shown in FIG. 2, a vibration exciter 19 for forced vibration feeding is disposed in the cold steel scrap storage chamber. The reliability of equipment feeding is improved by the vibration exciter 19 which has the function of initial inducement of steel scrap or forced vibration feeding of steel scrap when material clamping or retarding occurs because of a small inclination angle. Generally, when the steel scrap is in cold state, the probability of material clamping will be reduced; when the steel scrap is at a relatively high temperature, the probability of material clamping will be increased, and the probability of vibration exciter operation will be increased.

As an improvement of this embodiment, the steel scrap storage chamber and the material feeding and dedusting chamber have an inwardly dished arc-shaped bottom (not shown) so as to improve the capacity of the material tank to resist the impact of fed material. In order to reduce the gap between the arc-shaped bottom and the bottom of the door panel, the bottom end face of the door panel or the plug door has an arc corresponding to the arc-shaped bottom, so that the gap there between can be very small, and thus the blocking effect of the material blocking sealed arc-shaped door is further improved, as shown in FIGS. 4, 5 and 6.

As an improvement of this embodiment, in order to increase the material feeding speed, inclination angle α of the sealed feeding chute relative to the horizontal plane is set to 30-60°, as shown in FIG. 1. Experiment shows that when the inclination angle is 30-35°, the blanking process of cold material generally takes about 1-2 seconds, and will be faster when the inclination angle is larger.

Embodiment 2

Figure 7:
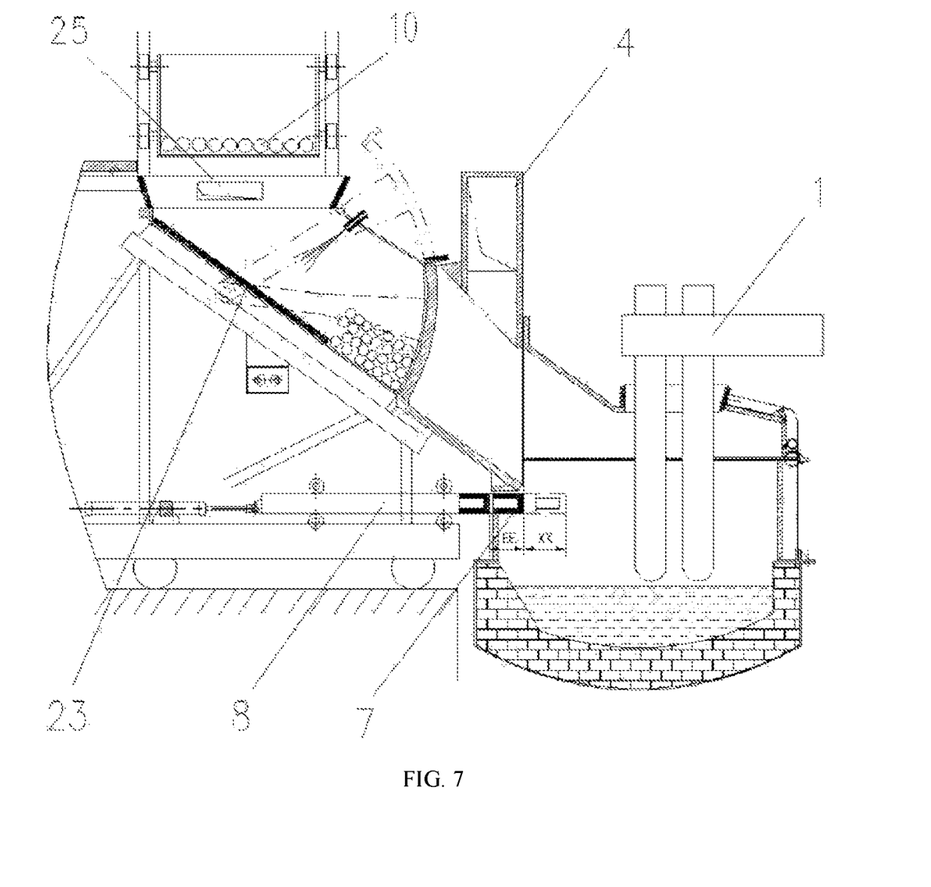
FIG. 7 is a structural schematic diagram of the second embodiment of a sealed feeder device utilized in an electric arc furnace of the present invention.

As shown in FIG. 7, unlike that of embodiment 1, the telescopic chute 7 of this embodiment evolves into a sealed pushing head, EE is the stroke at which the electric arc furnace can be inclined after the telescopic chute is withdrawn, and XX is the stroke for pushing steel. As the material guiding function of the telescopic chute is eliminated, the telescopic chute is simple to maintain and reliable to operate. The external feeder device 10 is a ramp rail automatic feeder device.

Embodiment 3

Figure 8:
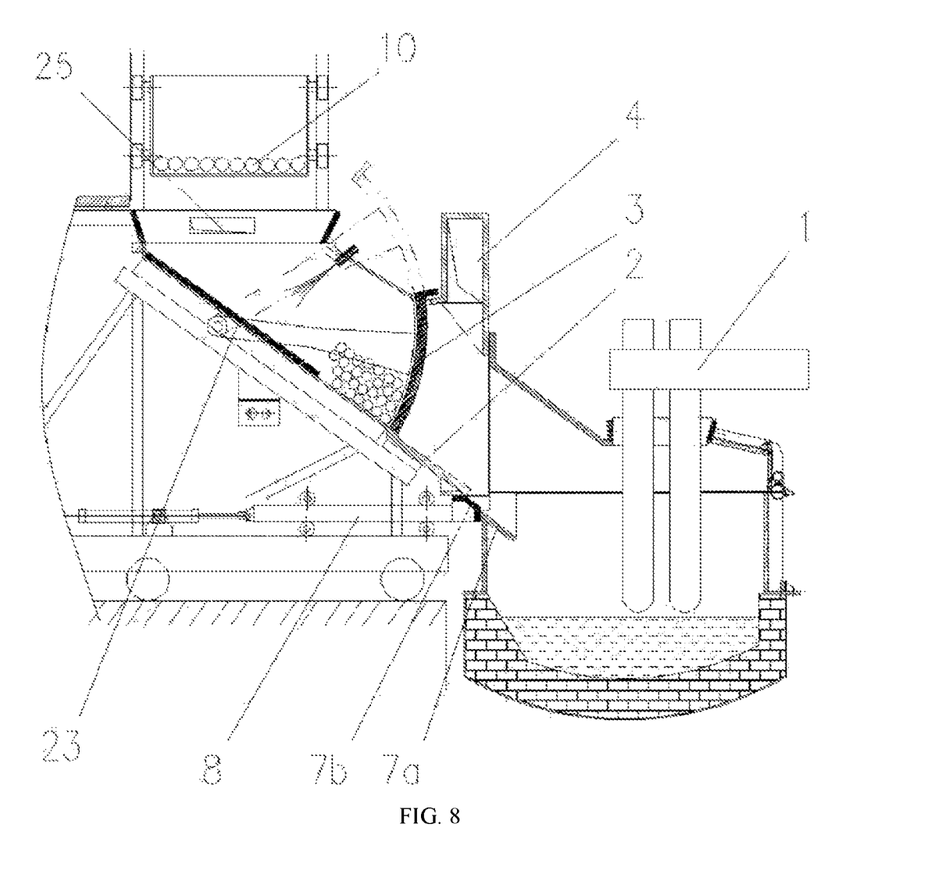
FIG. 8 is a structural schematic diagram of the third embodiment of a sealed feeder device utilized in an electric arc furnace of the present invention.

As shown in FIG. 8, the telescopic chute 7 evolves into an inclined section 7a integrated with the wall of the electric arc furnace and a telescopic section 7b fixed on the telescopic chute driving device. This mechanism eliminates the gap in the transition area, as gap is harmful in the production process: blanking and clamping will occur during feeding process; air seeping in and scrap overflow will occur in operation; if steel scrap is stuck, inclination of the electric arc furnace will be blocked, and even the equipment will be damaged. The mechanism is safe and reliable to use, but the steel pushing function and blanking point adjusting function of the telescopic chute 7 are eliminated.

Meanwhile, this structure has the following advantages: the stroke of the telescopic chute 7 is shortened, so the telescopic chute 7 is reliable to use and simple to maintain. The external feeder device 10 is also a ramp rail automatic feeder device.

Embodiment 4

Figure 10:
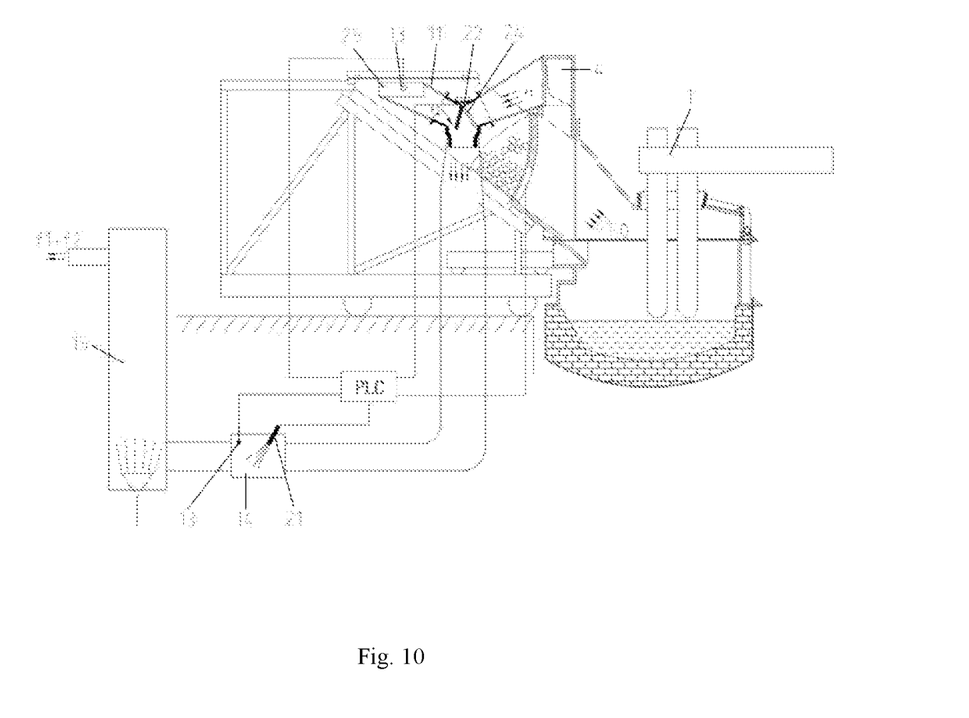
FIG. 10 is a structural schematic diagram of the fourth embodiment of a sealed feeder device utilized in an electric arc furnace of the present invention and a system diagram of a flue gas and temperature control method.

As shown in FIG. 10, in this embodiment, the material feeding and dust removal chamber and the steel scrap storage chamber are communicated by a three-way structure, the three-way structure 22 is provided with a swing valve plate 24, the swing valve plate 24 is confined in the middle part of the outlets of the material feeding and dust removal chamber and the steel scrap storage chamber and the inlet of the other passage (also called the mixed flue gas outlet passage or the dust removal passage of the electric arc furnace) of the three-way structure to control or close the flue gas flows at the outlets of the material feeding and dust removal chamber and the steel scrap storage chamber.

In order to prevent heat loss and ensure the safety of the equipment, the three-way structure 22 is a flue gas adjustment three-way valve, the surface of the swing valve plate 24 can be coated with resistant material, the equipment itself needs to be protected by inputting cooling water, the inner walls of the outlet passage of the material feeding and dedusting chamber and the outlet passage of the steel scrap storage chamber can also be coated with resistant material, and the outer metal shell is water-cooled. Meanwhile, the rotating shaft is water-cooled and serves as a cooling water passage of the swing valve plate 24;

both ends of the rotating shaft protrude from the three-way structure 22, can be connected with the driving mechanism, and are provided with position sensors and the like connected with PLC to control the swing position of the valve plate (as common mechanical components, these elements are not listed and drawn in detail).

The three-way structure 22 of this embodiment is preferred to be a Y-shaped structure, the swing valve plate swings around the shaft in the middle part of the inlet of the mixed flue gas outlet passage (near the midpoint of the Y shape), but the three-way structure 22 can also be a T-shaped structure.

Invention II: Flue Gas and Temperature Control Method for Sealed Feeding of Electric Arc Furnace Embodiment 1

Figure 9:
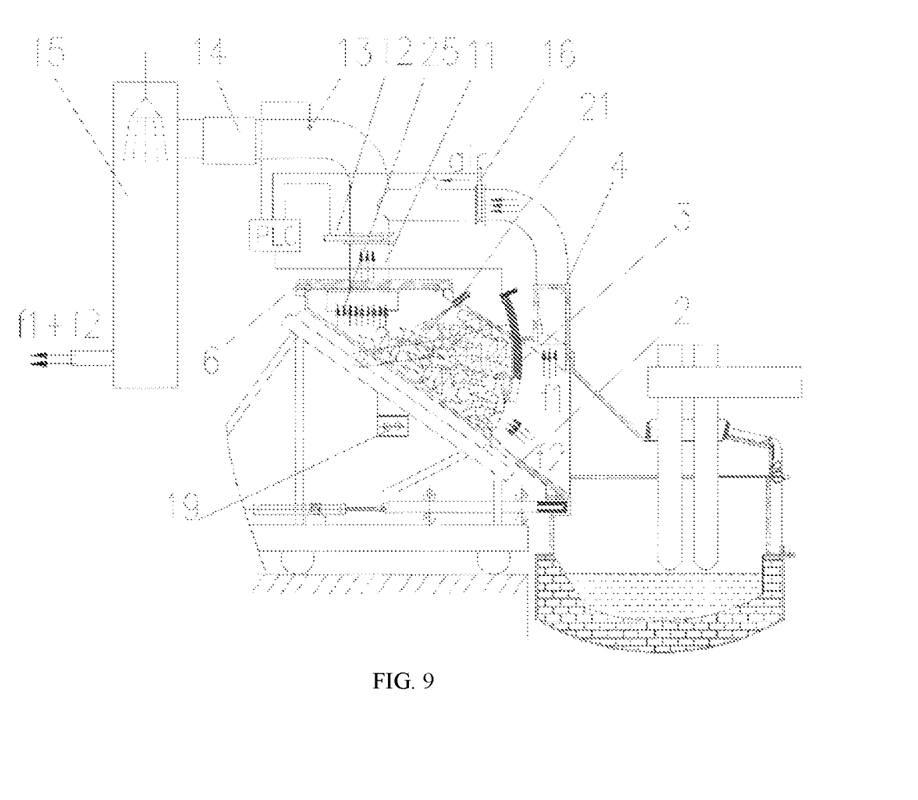
FIG. 9 is a system diagram of the first embodiment of a flue gas and temperature control method for sealed feeding of an electric arc furnace of the present invention.

FIG. 9 is a system diagram of a flue gas and temperature control method for sealed feeding of an electric arc furnace of this embodiment. As shown in the figure, the sealed feeder device utilized in an electric arc furnace is adopted to divide the flue gas of the electric arc furnace into two paths, wherein one path of high-temperature flue gas is guided out by the dust removal pipe near the electric arc furnace, and the other path of flue gas is guided out by the flow-splitting dust removal pipe after passing through the steel scrap in the sealed feeder device, the two paths of flue gas is mixed, and the ratio of the flow from the flow-splitting dust removal pipe to that from the dust removal pipe is controlled by flue gas adjustment devices on the dust removal pipe and the flow-splitting dust removal pipe to obtain a required flue gas mixture temperature and inhibit the production of dioxin.

Detailed Description: In the figure, the closed sealed feeding chute 5 of the sealing surface 6 is filled with intertwined and interstitial steel scrap, the steel scrap is blocked in the sealed feeding chute 5 by the partly opened material blocking sealed arc-shaped door 3 (which is closed in feeding and moderately opened after feeding. Experiment shows that due to the intertwining and bridging of steel scrap blocks, when an appropriate chute bottom inclination angle is chosen, the steel scrap in the chute can be blocked in whole by inserting part of the material blocking sealed door 3 into a sealed-like structure of the sealed feeding chute 5, and fall down in whole after the material blocking sealed door is drawn out). The flue gas of the electric arc furnace is divided into two paths, wherein one path f1 is guided out by the main dust removal pipe above the material feeding and dedusting chamber, and the other path f2 is guided out by the flow-splitting dust removal pipe 11 after passing through the opening gap of the material blocking sealed arc-shaped door 3 and the preheated steel scrap; then the two paths of flue gas is mixed again. The flue gas mixture temperature is detected by the temperature measuring element 13. If the detected temperature is too high (e.g. 1100° C.), the opening of the flow-splitting flue gas adjustment valve 12 will be increased, the amount of flue gas f2 will be increased, and the amount of flue gas f1 will be reduced; if the detected temperature is too low (e.g. 650° C.), the opening of the flow-splitting flue gas adjustment valve 12 will be reduced (the flue gas adjustment valve 12 can be any flue gas adjustment device on the dust removal port and pipe; if the dust removal port is made into a door with adjustable opening and can be closed, the dust removal port can also be used as the flue gas adjustment valve 12), the amount of flue gas f2 will be reduced, and the amount of flue gas f1 will be increased; in some operation stages, for example, when the amount of flue gas is small and the temperature of flue gas is low, the flue gas adjustment valve 12 can be closed. In addition, a hot flue gas adjustment device 16 can also provide auxiliary adjustment for the hot flue gas so as to control the ratio of the flow from the flow-splitting dust removal pipe to that from the main dust removal pipe to obtain a required flue gas mixture temperature. Dioxin in flue gas will be decomposed when the temperature of the flue gas is above 800° C. Considering heat loss and safety margin, the value of control temperature needs to be higher. For example, the control flue gas temperature can be 900° C. Meanwhile, in this embodiment, a burner 21 is added to the material feeding and dust removal chamber, which can provide auxiliary heating for the steel scrap and the flue gas so as to accurately control the required temperature.

In order to control the flue gas mixture temperature at 900° C. (higher than the dioxin pyrolysis temperature) and continue for more than 3 seconds to leave enough time for decomposition, a flue gas hold-up vessel 14 is needed before the flue gas enters the quench device. The flue gas hold-up vessel 14 can be a pipe, a combustion settling chamber, a heat storage device and the like, but as a minimum, the flue gas hold-up vessel 14 needs to have good leak tightness and low heat dissipation.

Subsequently, the flue gas enters the flue gas quench device 15. The flue gas quench device 15 can be a mixer, a sprayer or a heat exchanger, but the cooling speed needs to be higher than 300° C./S so as to inhibit the resynthesis of dioxin in flue gas cooling process.

In this embodiment, a flue gas adjustment device 16 is added to the hot flue gas passage and is controlled by a PLC control system, so the device can realize preheating and feeding functions and become a steel scrap preheating device or a sealed feeder device.

In this embodiment, air vents can be disposed on the hot flue gas passage to mix air into the flue gas and burn CO, NO, etc. in the flue gas, which can reduce the protoxide in the flue gas.

In this embodiment, the PLC control system is also used to control the connection between the flow-splitting flue gas adjustment valve, the temperature measuring element and the driving mechanism of the material blocking sealed arc-shaped door so as to realize the automation and intelligence of material feeding and preheating of the whole system.

Embodiment 2

FIG. 10 is an optimization of a flue gas and temperature control method for sealed feeding of an electric arc furnace of this embodiment. Unlike that of the first embodiment, the high-temperature flue gas guided out from the flow-splitting pipe is mixed with the low-temperature flue gas guided out from the steel scrap storage chamber in the three-way structure 22 which can adjust the flow of flue gas (to substitute part of functions of adjustment valve 12 and adjustment valve 16 in embodiment 1), the degree of opening on the left and right sides of the swing valve plate 24 is adjusted to control the ratio of the flue gas flow from the flow-splitting dust removal pipe to that from the dust removal pipe to obtain a required flue gas mixture temperature, and a burner can be added to the system as required to carry out relatively accurate control of the flue gas temperature; the others are the same as that in embodiment 1.

This embodiment reduces the flow-splitting adjustment valve, reduces the operating temperature of the valve, facilitates maintenance, reduces the equipment cost and improves the reliability of the system.

The present invention successfully realizes the control of the temperature of all the flue gas exhausted from the electric arc furnace by utilizing the flue gas of the electric arc furnace to preheat steel scrap, and inhibits the resynthesis of dioxin in flue gas. Meanwhile, in a time period of the smelting cycle of the electric arc furnace not suitable for steel scrap preheating, the steel scrap preheating process can be cut off conveniently so as to reduce the production of dioxin and achieve the unification of energy saving and being environmentally friendly. Specially, cold steel scrap is preheated by the waste heat of flue gas so as to realize the internal circulation of waste heat and make the device have the dual functions of material feeding and preheating. Finally, it should be noted that the above preferred embodiments are only used for describing the technical solution of the present invention rather than limiting the present invention. Although the present invention is already described in detail through the above preferred embodiments, those skilled in the art shall understand that various changes in form and detail can be made to the present invention without departing from the scope defined by claims of the present invention.

What is claimed is:

1. A sealed feeder device utilized in an electric arc furnace, comprising a sealed feeding chute having an outlet sealedly communicating with a side wall of the electric arc furnace and a material blocking sealed door disposed in the sealed feeding chute; the material blocking sealed door separates the sealed feeding chute into a cold steel scrap storage chamber and a material feeding and dedusting chamber, and is operated by a driving mechanism to separate or connect the cold steel scrap storage chamber and the material feeding and dedusting chamber; a strip replaceable liner plate is disposed in blanking point area of the sealed feeding chute; the material blocking sealed door is a planar straight panel or an arc-shaped panel, wherein the panel has a flue gas sealing edge on a periphery of the panel; the material blocking sealed door is an arc-swing material blocking sealed door constrained by swing arms which form a portal frame structure; one end of each swing arm is fixed together with the panel, and the other end is rotatably fixed together with the sealed feeding chute through a rotating shaft; a vibration exciter for forced vibration feeding is disposed in the cold steel scrap storage chamber; connection between the material feeding and dedusting chamber and the side wall of the electric arc furnace is provided with a telescopic chute and a telescopic chute driving device; an inclination angle of the sealed feeding chute relative to the horizontal plane is 30-60°.

2. The sealed feeder device utilized in an electric arc furnace according to claim 1, wherein the panel has tooth structures.

3. The sealed feeder device utilized in an electric arc furnace according to claim 1, wherein the telescopic chute is composed of an inclined section integrated with the wall of the electric arc furnace and a telescopic section fixed on the telescopic chute driving device.

4. The sealed feeder device utilized in an electric arc furnace according to claim 3, wherein the telescopic chute driving device is a guide cart or an oil cylinder or an air cylinder or an electric push rod.

5. The sealed feeder device utilized in an electric arc furnace according to claim 1, wherein the sealed feeder device further comprises a mobile cart which is provided with a fixing frame, and the sealed feeding chute is fixed on the fixing frame.

6. The sealed feeder device utilized in an electric arc furnace according to claim 1, wherein the steel scrap storage chamber and the material feeding and dedusting chamber have an inwardly dished arc-shaped bottom.

7. The sealed feeder device utilized in an electric arc furnace according to claim 1, wherein the material feeding and dedusting chamber and the steel scrap storage chamber are connected through a flue, and the degree of opening and closing of two dust removal pipes are controlled by valves.

8. The sealed feeder device utilized in an electric arc furnace according to claim 1, wherein the material feeding and dedusting chamber and the steel scrap storage chamber converge through a flue to a three-way connecting structure which can adjust flue gas flows.

9. The sealed feeder device utilized in an electric arc furnace according to claim 8, wherein the three-way structure is provided with a swing valve plate, the swing valve plate is confined in middle part of the outlets of the material feeding and dedusting chamber and the steel scrap storage chamber and the inlet of the other passage of the three-way structure to control or close the flue gas flows of the material feeding and dedusting chamber and the steel scrap storage chamber.

* * * * *